United States Patent [19]
Clark

[11] Patent Number: 5,644,717
[45] Date of Patent: Jul. 1, 1997

[54] SYSTEM FOR GENERATING LOCAL AREA NETWORK OPERATING STATISTICS BASED ON MONITORED NETWORK TRAFFIC AND METHOD THEREFOR

[75] Inventor: Robert Clark, Oakland, Calif.

[73] Assignee: Legent Corporation, Islandia, N.Y.

[21] Appl. No.: 466,230

[22] Filed: Jun. 6, 1995

Related U.S. Application Data

[63] Continuation of Ser. No. 992,439, Dec. 17, 1992, abandoned.

[51] Int. Cl.$^6$ ................................................ G06F 11/30
[52] U.S. Cl. ............... 395/200.11; 395/800; 364/241.8; 364/242.95; 364/264.4; 364/284.4; 364/DIG. 1
[58] Field of Search ...................... 395/800, 200.11; 364/241.8, 242.95, 264.4, 284.4, DIG. 1

[56] References Cited

U.S. PATENT DOCUMENTS

| | | | |
|---|---|---|---|
| 4,677,588 | 6/1987 | Benjamin et al. | 395/325 |
| 4,866,704 | 9/1989 | Bergman | 370/85.4 |
| 5,038,345 | 8/1991 | Roth | 370/94.1 |
| 5,101,402 | 3/1992 | Chiu et al. | 370/17 |
| 5,208,665 | 5/1993 | McCalley et al. | 348/12 |
| 5,317,568 | 5/1994 | Bixby et al. | 370/85.6 |

OTHER PUBLICATIONS

IEEE Network, vol. 1, no. 3, Jul. 1987, New York, US pp. 13–19; M. Soha 'A distributed approach to LAN monitoring using intelligent high performance monitors'; see p. 14, left col., line 56–p. 15; right col., line 38.

Data Communications, vol. 21, No. 1, Jan. 1992, New York, US; pp. 87–100 XP257015; M. Jander 'Mainframe consoles get token ring data'.

IBM Technical Disclosure Bulletin, vol. 25, No. 2, Jul 1982, New York, us pp. 543–547; L.H. Borysowich et al. 'Network monitor'.

IBM Technical Disclosure Bulletin, vol. 28, No. 8, Jan. 1986, New York, pp. 3617–3618.

Elektronik, vol. 41, No. 5, 3 Mar. 1992, Munchen De pp. 81–87 XP293128; K. Hoing, Es mu nicht immer ein Protokollanalysator sein.

Borysowich et al., "Network Monitor", IBM Technical Disclosure Bulletin, vol. 25, No. 2, Jul. 1982, New York, pp. 543–547.

*Primary Examiner*—Alyssa H. Bowler
*Assistant Examiner*—John Harrity
*Attorney, Agent, or Firm*—Kirkpatrick & Lockhart LLP

[57] ABSTRACT

A system for generating operating statistics for a network interconnecting at least two stations wherein each of those stations may send and receive messages during a session is implemented in software programmed to monitor the messages on the network, assign a direction to each of the messages with respect to the session based on the monitoring step, determine the role assumed by each of the stations based on the assigning step and calculate statistics for one of the stations based on the determining step.

16 Claims, 14 Drawing Sheets

5,644,717

SYSTEM FOR GENERATING LOCAL AREA NETWORK OPERATING STATISTICS BASED ON MONITORED NETWORK TRAFFIC AND METHOD THEREFOR

This is a continuation of application Ser. No. 07/992,439 filed on Dec. 17, 1992, now abandoned.

BACKGROUND OF THE INVENTION

1. Field of the Invention

The present invention is directed generally to a performance analysis system for a network and more specifically to a system and method for generating network operating statistics based on monitoring of network messages.

2. Description of the Background of the Invention

A current trend in the computer industry is the use of individual workstations interconnected to other workstations using local area networks. Such networks can adopt various configurations and support many types of functions. Some networks are configured with a file server, which is capable of supporting multiple workstations, while others are configured to support communications between a workstation and a mainframe computer. In the latter case, individual workstations may appear to be terminals on the network as viewed by the mainframe computer, communicating over the network using protocols compatible with that of the mainframe. One such network communications protocol is known as Systems Network Architecture ("SNA").

The efficient operation of a SNA network is critical both in terms of mainframe computer efficiency and individual workstation productivity. The ability to measure network response times associated with the workstations and the ability to determine bottlenecks or other network inefficiencies which may detract from network response time is becoming increasingly important. There are several computer programs which have the ability to measure end-to-end response time for particular message sequences, and other programs which are able to monitor network loading and utilization. However, there are no systems which can nondestructively monitor SNA network messages, analyze those messages to determine the role of each station on the network, and compute network operating statistics therefrom. Accordingly, the need exists for a product that is able to monitor all communications on an SNA network, determine the role of the station on the network, and derive operating statistics for that network, such operating statistics being useful in determining poor network performance and isolating the cause thereof.

SUMMARY OF THE INVENTION

The present invention is directed to a system for generating operating statistics for a network interconnecting at least two stations wherein each of those stations may send and receive messages during a session with any other of the stations attached to the network. In the preferred embodiment, the present invention is embodied in software capable of: monitoring the messages on the network: assigning direction data to each of the messages with respect to the session as a result of the monitoring step; determining the role assumed by each of the stations in response to the assigning step; and calculating statistics for one of the stations in response to the determining step. In a system wherein one of the stations is determined to be a workstation, the calculating step includes computing response times for the workstation. In a system wherein another one of the stations is determined to be a gateway, the calculating step further includes computing delay times for the messages sent from the workstation to the gateway. Further, the software embodying the system of the present invention may compute an average of the delay times and compute a maximum and minimum of the delay times. In a system wherein one of the stations is determined to be a PC3270 Gateway, the calculating step includes computing the queue depth for the PC3270 Gateway, computing an average queue depth, and maintaining a history of that queue depth. The calculating step may further include computing service times for the PC3270 Gateway.

The present invention is also directed to a method for generating operating statistics for a network interconnecting at least two stations where each of the stations may send and receive SNA messages during a session with any other of the stations attached to the network. The method includes the steps of monitoring the messages on the network, assigning direction data to each of the messages with respect to the session, determining the role assumed by each of the stations, and calculating statistics for one of the stations.

The system and method for generating operating statistics for a network provides the means for measuring critical response times and identifying potential bottlenecks in the network. This information is critical for maintaining the efficient operation of an SNA network, thereby maintaining mainframe computer efficiency and high workstation productivity. These and other advantages and benefits of the present invention will become apparent from the description of a preferred embodiment hereinbelow.

BRIEF DESCRIPTION OF THE DRAWINGS

For the present invention to be clearly understood and readily practiced, preferred embodiments will now be described, by way of example only, with reference to the accompanying figures wherein.

DETAILED DESCRIPTION OF THE PREFERRED EMBODIMENT

Figure 1:
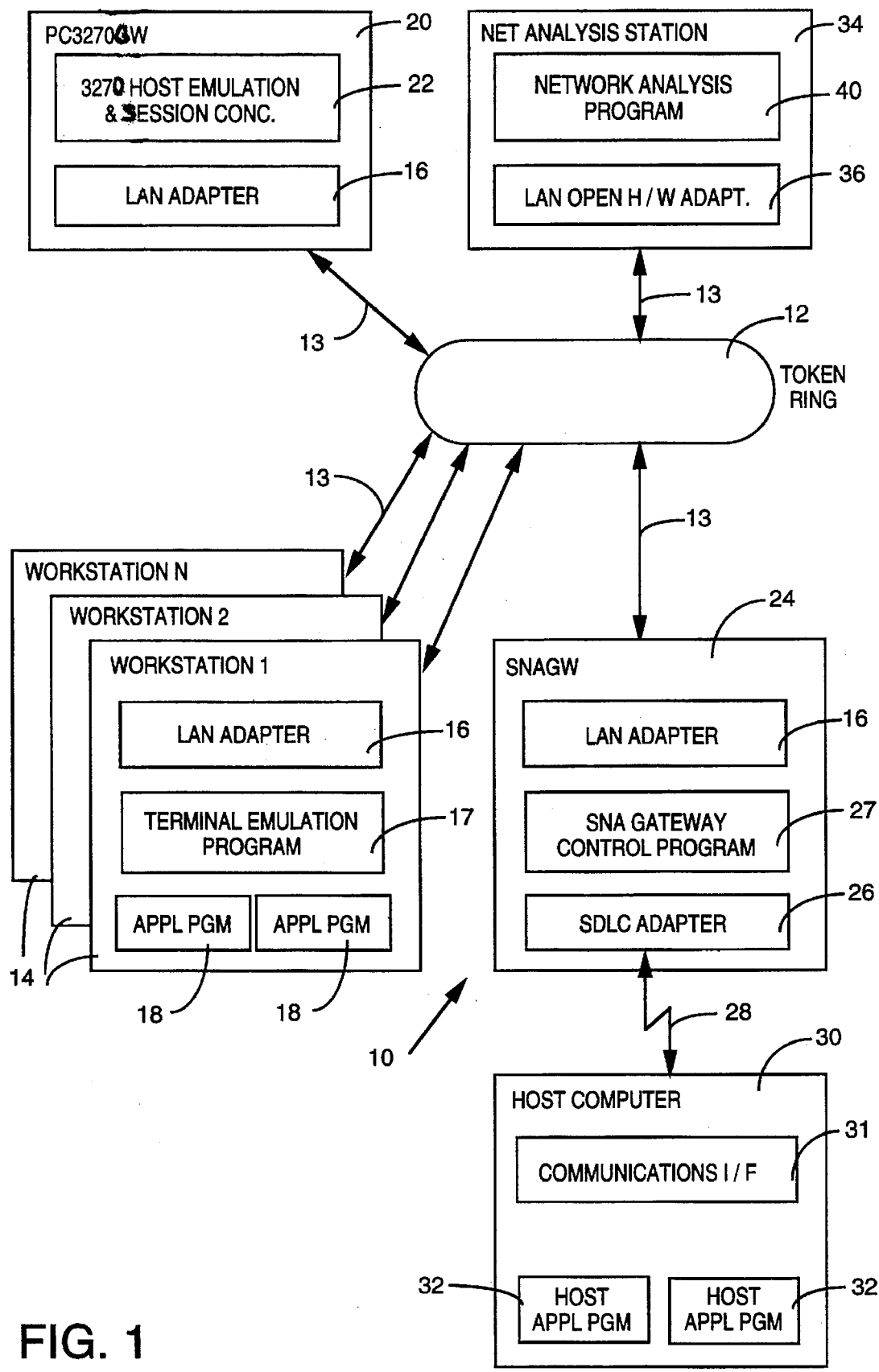
FIG. 1 illustrates a simplified representation of a typical local area network configuration in which the system and method of the present invention may be employed.

FIG. 1 illustrates a simplified representation of a typical computer communications network in which the system and method of the present invention for generating operating statistics may be employed. Like reference numerals are employed among the various figures to designate like elements. Unless otherwise stated, each of the following terms shall be defined as follows:

| TERM | DEFINITION |
|---|---|
| SNA | System Network Architecture |
| Session Partner | In SNA, one of the two network addressable units having an active session. |
| SNA Session | A logical connection between two session partners. Most commonly, one partner is a user terminal or personal computer ("PC"), and the other partner a program residing on a mainframe computer. |
| Logical Unit ("LU") | In SNA, a port through which an end user accesses the SNA network to communicate with another end user and through which the end user accesses the functions provided by the system services control point ("SSCP"). |
| Primary Logical Unit (LU1) | The logical unit that sends the session activation request, usually the SNA session partner which resides in the mainframe. |
| Secondary Logical Unit (LU2) | The logical unit that receives the session activation request, usually the session partner which resides in a terminal or workstation. |
| Workstation Response Time | The elapsed time between when a user starts a transaction request, usually by depressing the enter key) and the receipt at the terminal of the transaction reply. |
| Gateway Service Time | The elapsed time between the receipt of a message by a concentrating gateway, and the retransmission of that message by that gateway. |
| Gateway Queue Depth | The number of messages in a particular session direction which are queued in front of a received message. |
| Workstation | Station which acts only as an SNA secondary logical unit. |
| SNA Gateway ("SNAGW") | Station which may appear as primary and/or secondary logical unit, but which has only one end of each session on the monitored LAN. Such station acts as a portal to other parts of the SNA network. |
| PC3270 Gateway ("PC3270GW") | Station which may appear as a primary and/or a secondary logical unit, and which has both ends of each session on the monitored LAN. The station sends and receives all of its traffic on the monitored LAN, and acts as a session concentrator. |

With reference to FIG. 1, there is shown a computer communications network 10 comprising multiple user workstations 14, an SNAGW Station 24, a PC3270 Gateway station 20, and a network analysis station 34, all interconnected via a token ring network 12 and connectors 13. A description of SNA messages and protocols may be found in IBM Publication NO. GA27-3136 entitled "System Network Architecture Formats" which is hereby incorporated by reference. While the invention described herein may be adapted for use in a variety of network topologies, by way of example only, the system and method of the present invention will be described in conjunction with SNA protocols implemented on a token ring network 12.

As well understood by those skilled in the art, the token ring uses a token to provide priority access to the network. A token is passed around the ring, and within the token is an indicator which identifies whether the ring is free or busy. The token passes each station around the ring, and if a station wishes to transmit data and the token is empty, that station seizes or captures the ring by modifying the token to a start-of-user-frame indicator. Data and control fields are appended to the token and the entire message is transmitted to the next station on the ring. Messages comprise subunits called frames. Except as described herein with respect to the network monitoring station 34, only the station designated as the receiver of a particular message needs to read the fields appended to the token. Additionally, there are methods of assigning a priority level to each station and accessing the network based upon priority. A full description of a token ring network 12 is beyond the scope of this specification, but further details may be found in the Institute of Electrical Electronic Engineers (IEEE) Standard, No. 802.5, which is hereby incorporated by reference.

The frames on a local area network include a series of headers which may sometimes be followed by data. In a token ring network 12, the first frame is a physical header. The physical header includes, inter alia, a frame control field. If the frame control field has a value indicating Logical Link Controller ("LLC"), an LCC header follows which may contain an indication of an I-Frame to follow. Then if the Destination Service Access Point ("DSAP") and the Source Service Access Point ("SSAP") within the following I-Frame have a value of four, the first byte of an SNA header follows. The system and method of the present invention assumes that the frames to be analyzed have been determined to be SNA frames. It is on those SNA frames that the invention operates.

Referring again to FIG. 1, stations are attached to the token ring network 12 using the connectors 13. Such connectors 13 may be shielded twisted-pair cables, unshielded telephone-type cables, fiber optic, or any other type of suitable connector for the particular network architecture. Each workstation 14, SNAGW station 24, and PC3270GW station 20 on the token ring 12 has a LAN adaptor card 16. The LAN adaptor cards 16 provides the hardware interface and may be a commercial off-the-shelf component. The LAN adaptor cards 16 typically fit into a slot (not shown) in user workstations 14, PC3270GW stations 20, or SNAGW stations 24. Each of the user workstations 14 also typically contains a terminal emulation program 17 and user applications programs 18 which are accessible by users at each of the user workstations 14.

The PC3270GW station 20 acts as a session concentrator for communications between the user workstations 14 and an SNA host computer 30. By way of example, a PC3270GW station 20 may be an IBM PC3270 Gateway which is configured such that both ends of its session are communicating on the token ring network 12. A 3270 control program 22 provides a host emulation function and the session concentrator function.

The SNAGW station 24 is configured such that only one end of each SNA session is conducted on the token ring network 12. SNAGW stations 24 act as portals to other parts of the SNA network. An example of an SNAGW station 24 is an IBM 3274 controller which has a controller program 27, a connection to the local area network via a LAN adaptor 16 and an SDLC adaptor 26 through which it communicates over telephone lines 28 to a host computer 30 or a front end processor (not shown). The SNA host computer 30 has a communications interface 31 and may have multiple host application programs 32 available and running therein. User workstations 14 may access the host application programs 32 via the token ring network 12, the PC3270GW station 20, the SNAGW station 24 and telephone lines 28.

It is within the above-described token ring environment where the network analysis station 34 containing the functions of the system and method of the present invention may be usefully employed. The network analysis station 34 may be comprised of a personal computer or other workstation attached to the token ring 12 using connector 13. The connector 13 is connected to a LAN adaptor board 36 positioned in a slot (not shown) within the network analysis station 34. The LAN adaptor board 36 is similar to the LAN adaptor board 16 except that the LAN adaptor board 36 must support Copy All Frames ("CAF") mode which is capable of reading every frame on the token ring network 12. For example, the LAN adaptor board 36 may be a Racore or Proteon Token Ring Adapter board.

Figure 2:
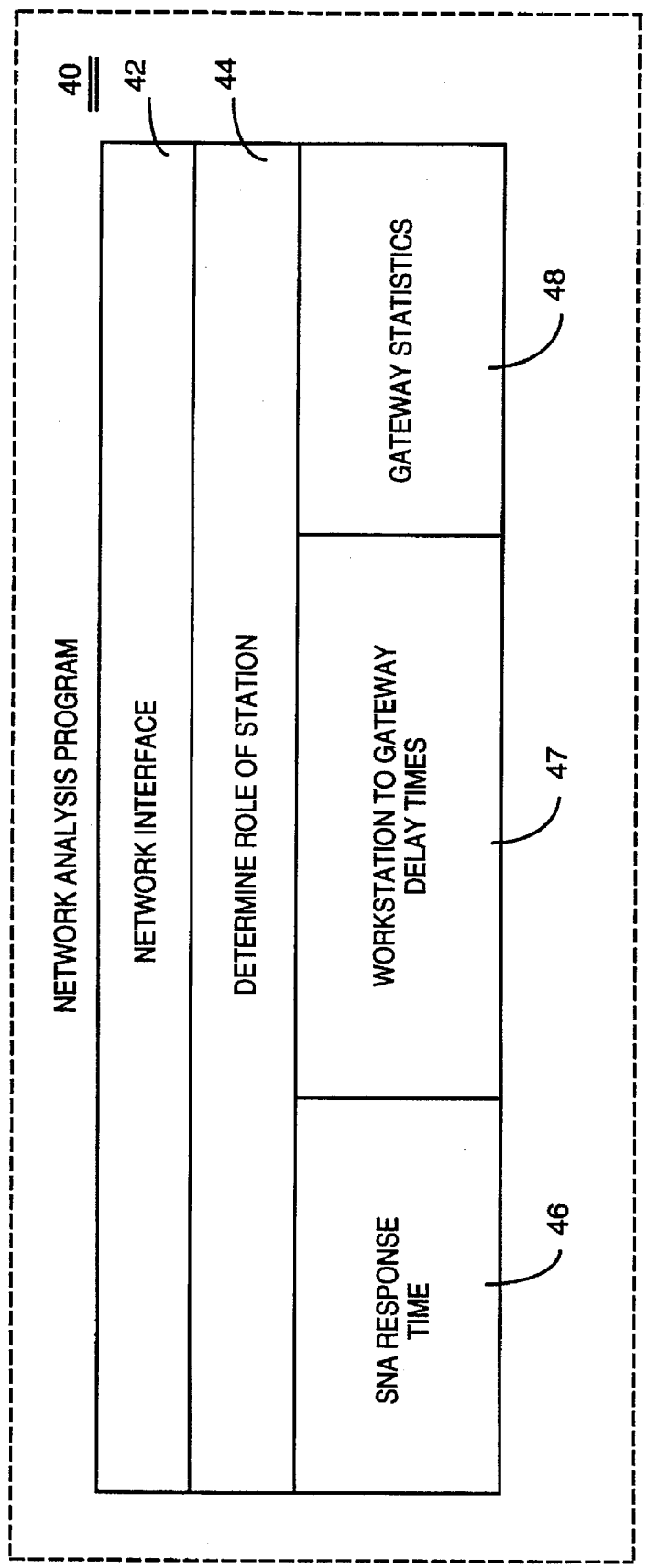
FIG. 2 illustrates a functional block diagram of a network analysis program embodying the system and method of the present invention.

Also residing in the network analysis station 34 is the network analysis program 40 which provides the functionality for the system and method of the present invention. The network analysis program 40 may optionally be configured as a Terminate and Stay Resident ("TSR") program if running under MS/DOS or PC/DOS, but must receive high priority for servicing interrupts regardless of the operating system used. As illustrated in FIG. 2, the network analysis program 40 comprises several key functions. The network interface function 42 provides control for the LAN adaptor board 36. The function designated as Determine Role of Station 44 provides for the classification of each of the stations on the network as a user workstation 14, a PC3270GW station 20, or an SNAGW station 24. Such information in and of itself is useful to users of the network and may be provided as an output to such users.

If the role of the station has been determined, one of three functions, each generally directed to calculating performance statistics, will be called. If the Determine Role of Station function 44 determines the station to be a user workstation 14, the SNA Response Time function 46 will be called. Further, if one of the other stations is determined to be a gateway of either type, that is, a PC3270GW station 20 or a SNAGW station 24, the Workstation to Gateway Delay Times function 47 will be called. In the case where the role of one of the stations is determined to be a PC3270GW station 20, then the Gateway Statistics function 48 will be called. The Gateway Statistics function 48 includes the functions of computing gateway service time, queue depth and other statistics related thereto. Each of the above-identified functions are described in further detail below.

Figure 3:
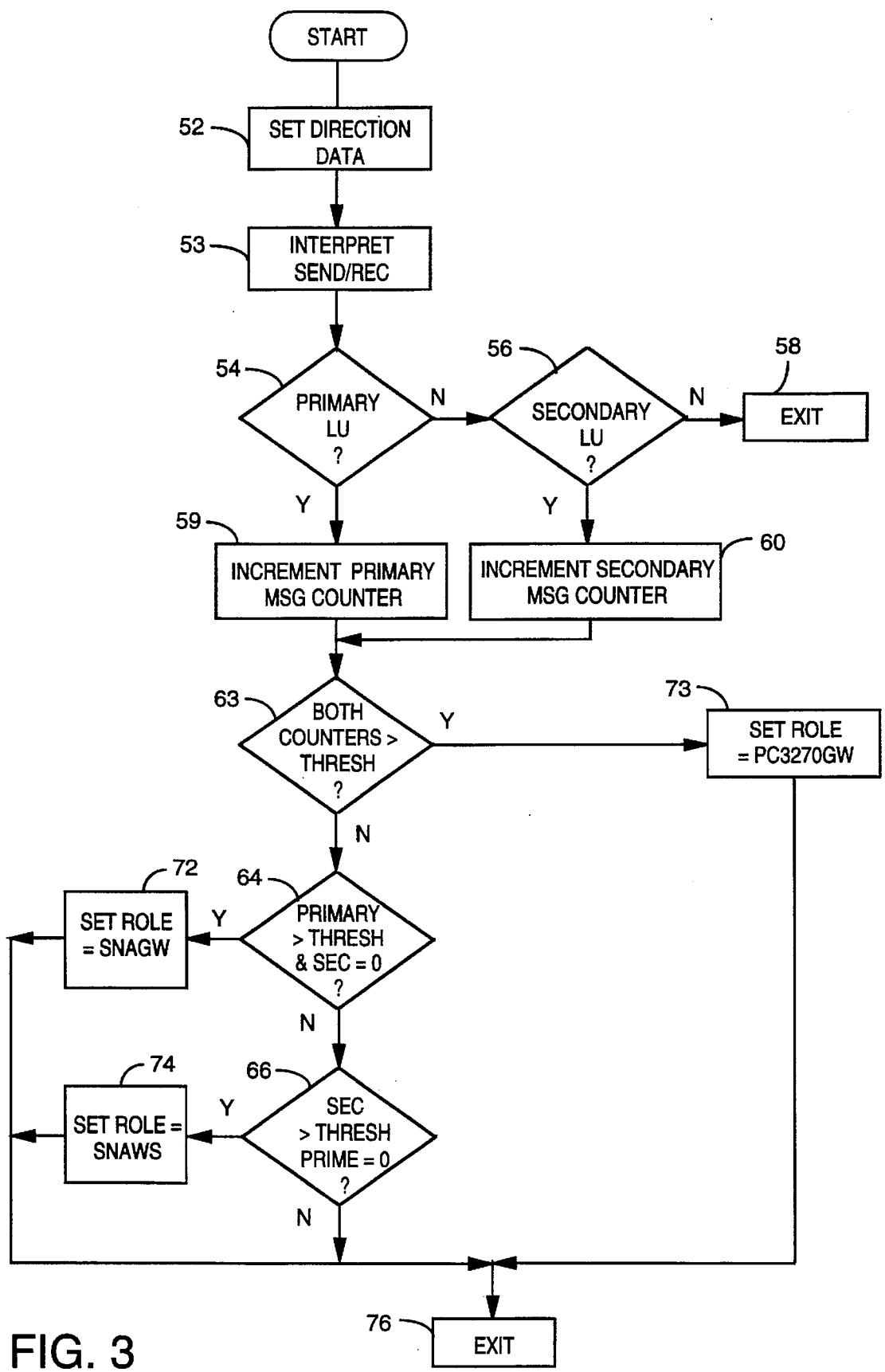
FIG. 3 illustrates a flow chart for a system and a method of determining the role of a station on the network.

With reference to FIG. 3, there is shown a flow chart for the Determining Role of Station function 44 indicating the steps used to determine the role that each station is assuming on the network. By way of overview, determining the role of the station entails first determining direction data for each individual message on the network with respect to a session. The session direction data will be classified as either OUTBOUND, INBOUND, or UNKNOWN. INBOUND frames are defined as frames originating in a secondary logical unit and flowing to a primary logical unit for an LU—LU session or originating in a physical unit ("PU") or LU and flowing to an SSCP. OUTBOUND frames are frames originating in a primary logical unit and flowing to a secondary logical unit for an LU—LU session or originating in an SSCP and flowing to a PU or LU. As messages being sent and received by stations on the token ring network 12 are monitored by the network analysis station 34, information is accumulated about the role that the station has adopted. When a sufficient number of messages have been observed to categorize a station as assuming one of the three roles, the station's role is determined.

It will be understood by those skilled in the art that the process flows described herein are implementation dependent and may be influenced by individual programming techniques and styles. It will further be apparent to those skilled in the art that the process of determining the station type is inherently statistical, and is, therefore, not fully deterministic. This is because some SNA frames have ambiguous direction and the specific implementation, as will be described below, does not categorize all frames which could possibly be categorized. The number of messages observed before categorization represents a compromise between a high probability of correct categorization on the one hand and system performance on the other. I have found that the steps performed and the number of messages observed as described herein represent a good compromise between performance and accuracy. However, as will be apparent, the criteria disclosed herein may be adjusted to tailor the system to suit a particular application.

With reference to FIG. 3, step 52 wherein each frame is classified as INBOUND, OUTBOUND, or UNKNOWN is the first step in Determining Role of Station function 44. Step 52 may be fairly comprehensive, depending on how one wants to allocate resources in attempting to classify a frame as INBOUND or OUTBOUND before simply declaring that direction data to be UNKNOWN. FIGS. 4A-4F describe the process flow of step 52 in detail.

The assignment of direction data to each frame is determined based on an interpretation of the SNA header information. Accordingly, unless otherwise specified, the terms as used herein have their normal meaning as defined by the SNA architecture.

Figure 4A:
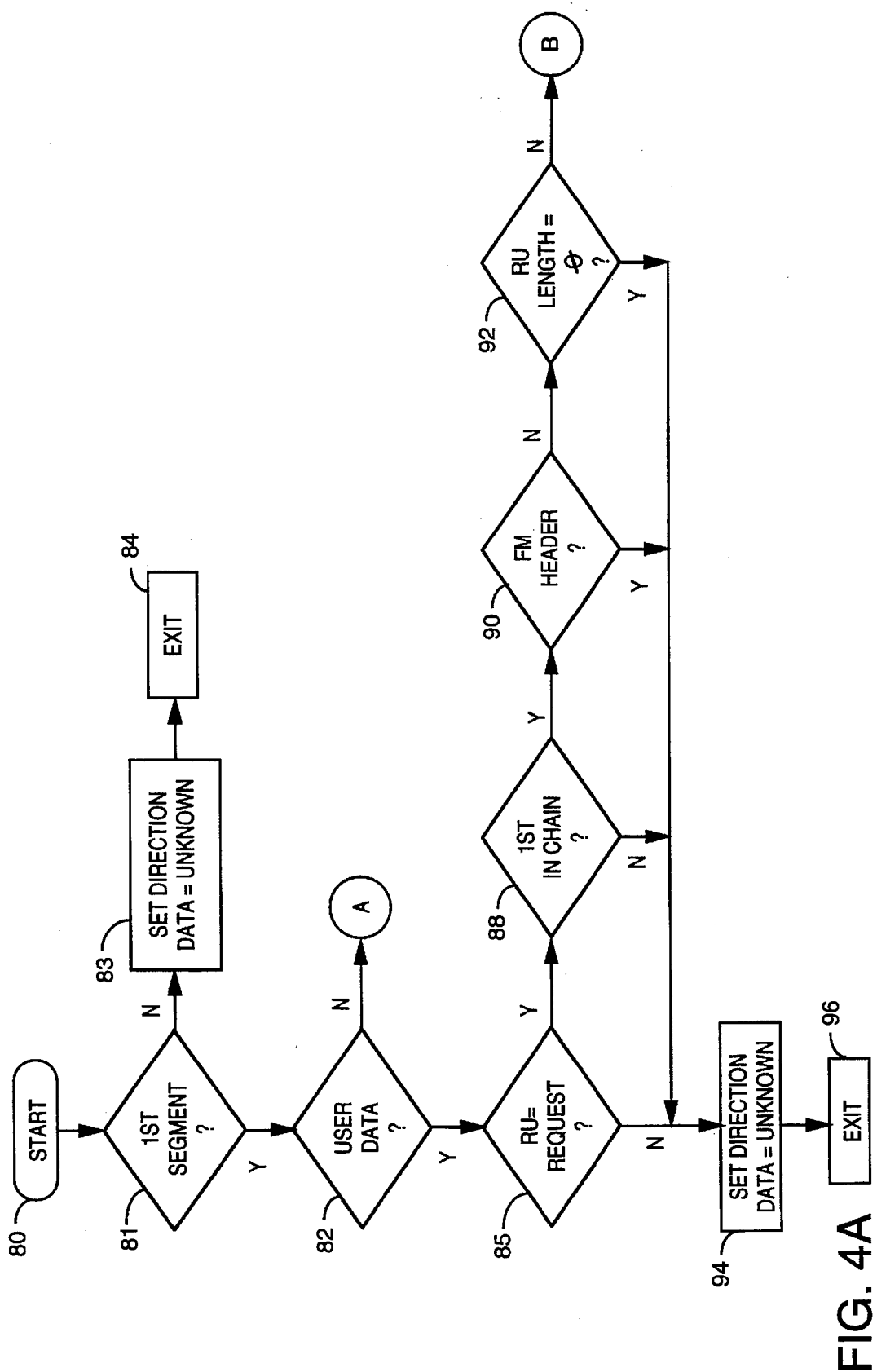
FIGS. 4A through 4F illustrate flow charts for a system and method of assigning direction data to each message with respect to an SNA session.

The process of assigning direction data is started at step 80 in FIG. 4A, with the first step 81 determining whether the frame is a first segment. If the frame is not a first segment, the direction data is set to UNKNOWN at Step 83 and the program is exited at step 84. If the frame is a first segment, step 82 determines whether the frame is a user data frame. A user data frame meets all three of the following conditions: the DAF ≠0, OAF ≠0, and the request unit type is function management data. If it is determined at step 82 that the frame is not user data, then the flow proceeds to FIG. 4B at point A. If at step 82 it is determined that the frame is a user data frame, a determination is made at step 85 as to whether the frame is an RU request. If the frame is an RU request, a comparison is made at step 88 as to whether the frame is the first in a chain. If the frame is the first in the chain, the next determination is made at step 90 as to whether a Function Management ("FM") header is present. Finally, if a Function Management header is not present, the next determination is made at step 92 as to whether the request unit length is equal to zero. Following that flow, therefore, if the request unit length is not zero, the processing flow continues at point B in FIG. 4C. Further, if at step 85 the frame is not an RU request, or if at step 88 the frame is not the first in a chain, or if at step 90 the frame is a Function Management ("FM") header, or if at step 92 the RU length is equal to zero, then the direction data for that frame is set to UNKNOWN at step 94. Thereafter, this portion of the program is exited at step 96.

Figure 4B:
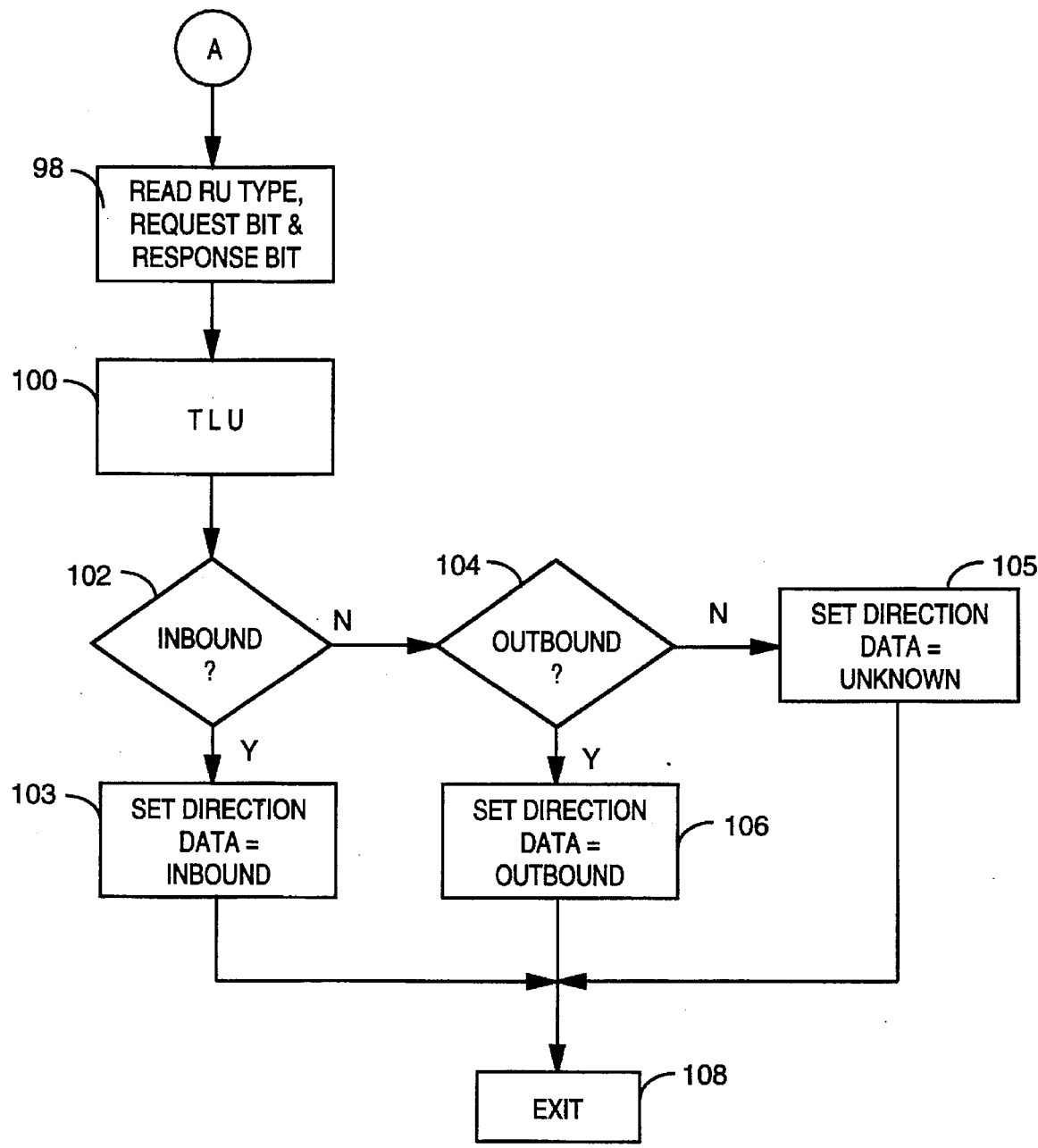

With reference to FIG. 4B, if the frame is a formatted request unit and the Request Unit type is not function Management data, then the Request Unit ("RU"), the request bit, and the response bit are read at step 98. From there, a table lookup function ("TLU") may be performed at step 100, as the direction with respect to a session of some messages may be determined by the knowledge of the RU and whether the message is a request or a response.

TABLE I

| REQUEST UNIT | REQUEST | RESPONSE |
| --- | --- | --- |
| ACTLU | Outbound | Inbound |
| DACTLU | Outbound | Inbound |
| ACTPU | Outbound | Inbound |
| DACTPU | Outbound | Inbound |
| CLEAR | Outbound | Inbound |
| BIND | Outbound | Inbound |
| SDT | Outbound | Inbound |
| UNBIND | Unknown | Unknown |
| RQR | Unknown | Unknown |
| STSN | Unknown | Unknown |
| BIS | Unknown | Unknown |
| SBI | Unknown | Unknown |
| QEC | Unknown | Unknown |
| RELQ | Unknown | Unknown |

Table I identifies the types of request units that may be included in the table lookup function at step 100. For example, the sixth entry shows the Request Unit "BIND." For the RU BIND, if the request/response indicator signifies a request, the direction of the message with respect to the session is OUTBOUND, that is, the BIND request is flowing from an LU1 to an LU2. Conversely, if the request/response indicator signifies a response, the direction with respect to the session is determined to be INBOUND and the message is flowing from an LU2 to an LU1. Using the information derived from the table lookup function at step 100, the determination is made at step 102 and step 104 as to whether the frame is flowing in the INBOUND or OUTBOUND direction. If the frame is flowing inbound, the direction data for that frame is set equal to INBOUND at step 103. If the frame is flowing outbound, the direction data is set to OUTBOUND at step 106. Thereafter, this portion of the flow may be exited at step 108.

If, as a result of the table lookup function, the direction step is unknown, the direction data is set to UNKNOWN at step 105 and the program is exited at step 118.

Figure 4C:
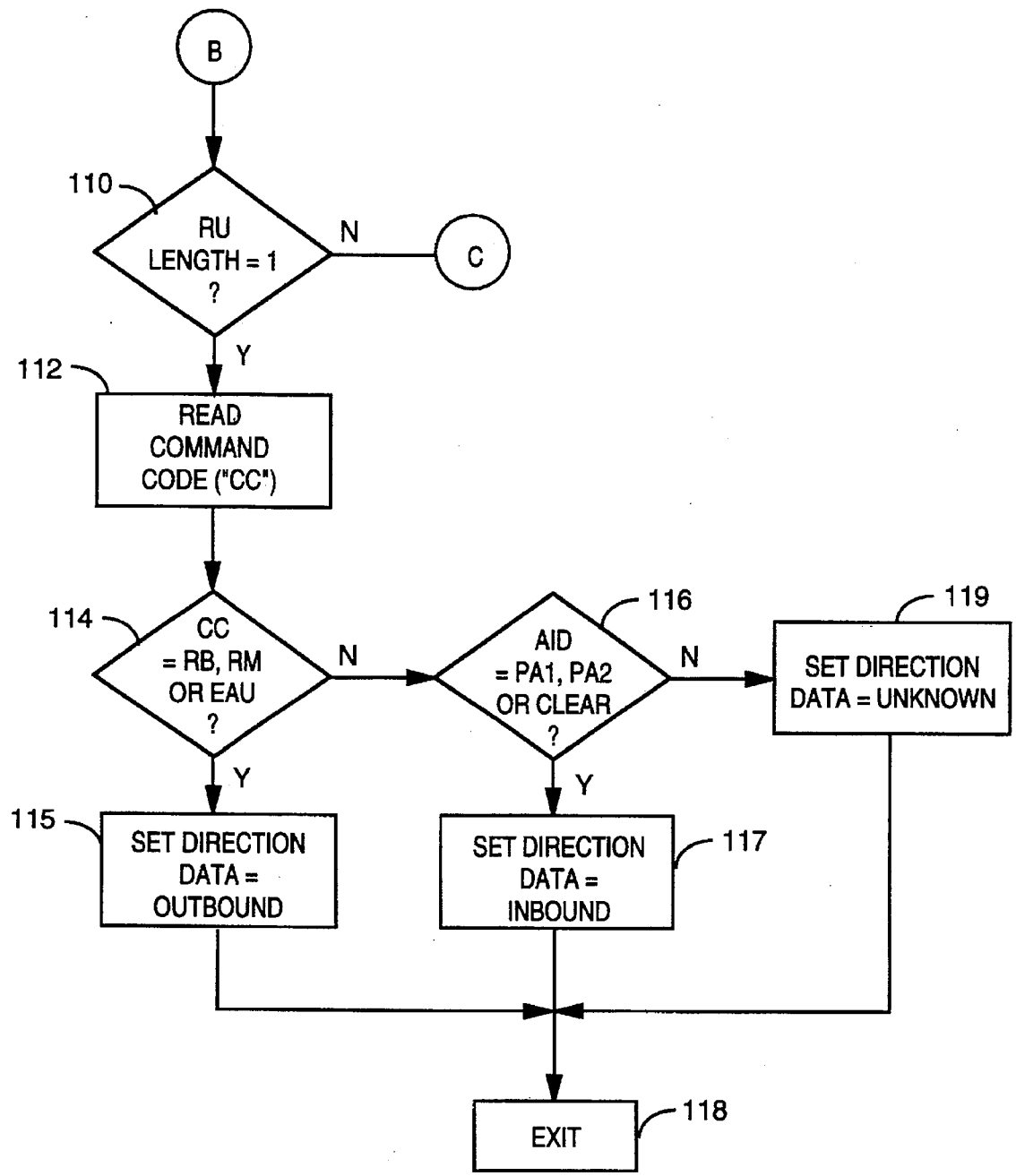

From entry point B in FIG. 4C, step 110 determines whether the request unit length is equal to 1. If the length of the request unit is equal to one, the command code ("CC") is read at step 112. At step 114, the command code is interpreted to determine whether the command identified is a Read Buffer ("RB") command, a Read Modified ("RM") command, or an Erase All Unprotected ("EAU") command. If the command code is one of the aforementioned commands, the direction data is set to OUTBOUND at step 115. Thereafter the program is exited at step 118.

If at step 114 the command code is not equal to RB, RM, or EAU, then the Attention Identifier ("AID") byte is checked at step 116. If the AID byte is set to PA1, PA2, or Clear, then the direction of the message is inbound and the direction data is set to INBOUND at step 117. Thereafter, the program is exited at step 118. Referring again to step 116, if the AID byte is not equal to PA1, PA2, or clear, then the direction is unknown and the direction data is set to UNKNOWN at step 119 and the program is exited at step 118.

Figure 4D:
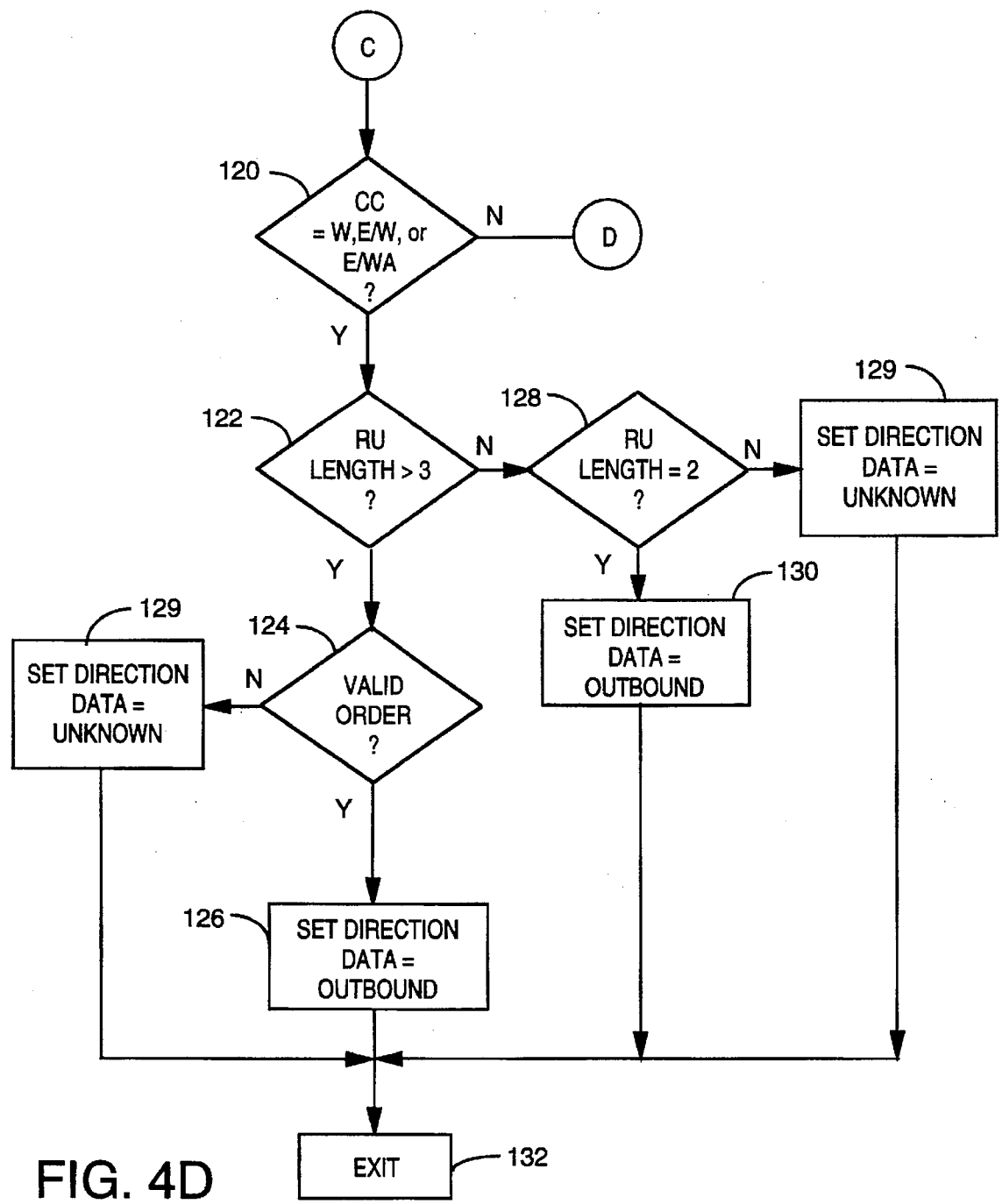

If the RU length is not equal to one at step 110, the processing continues at point C in FIG. 4D. At step 120, the command code is again checked to determine whether such command is Write ("W"), Erase/Write ("E/W"), or Erase Write Alternate ("E/W/A"). If it is determined that at step 120 that the command is Write, Erase/Write, or Erase/Write Alternate, then the request unit ("RU") length is checked at step 122. If the RU length is greater than three, then the first byte following the WCC is checked at step 124 to see if such byte is a valid order. A valid order may be one of the following: Set Buffer Address, Start Field, Insert Cursor, Program Tab, Set Attribute, Start Field Extended, Modify Field, Repeat to Address, Erase Unprotected To Address, or Graphic Escape. If at step 124 the first byte following the WCC is a valid order, then the message is flowing in the outbound direction and the direction data is set to OUTBOUND at steps 126. Thereafter the program is exited at step 132.

If at step 122 the RU length is found not to be greater than three, the determination is made at step 128 as to whether that RU length equals two. If the RU length equals two, the message is flowing in the outbound direction and the direction data is set to OUTBOUND at step 130. Thereafter, the program is exited at step 132.

Figure 4E:
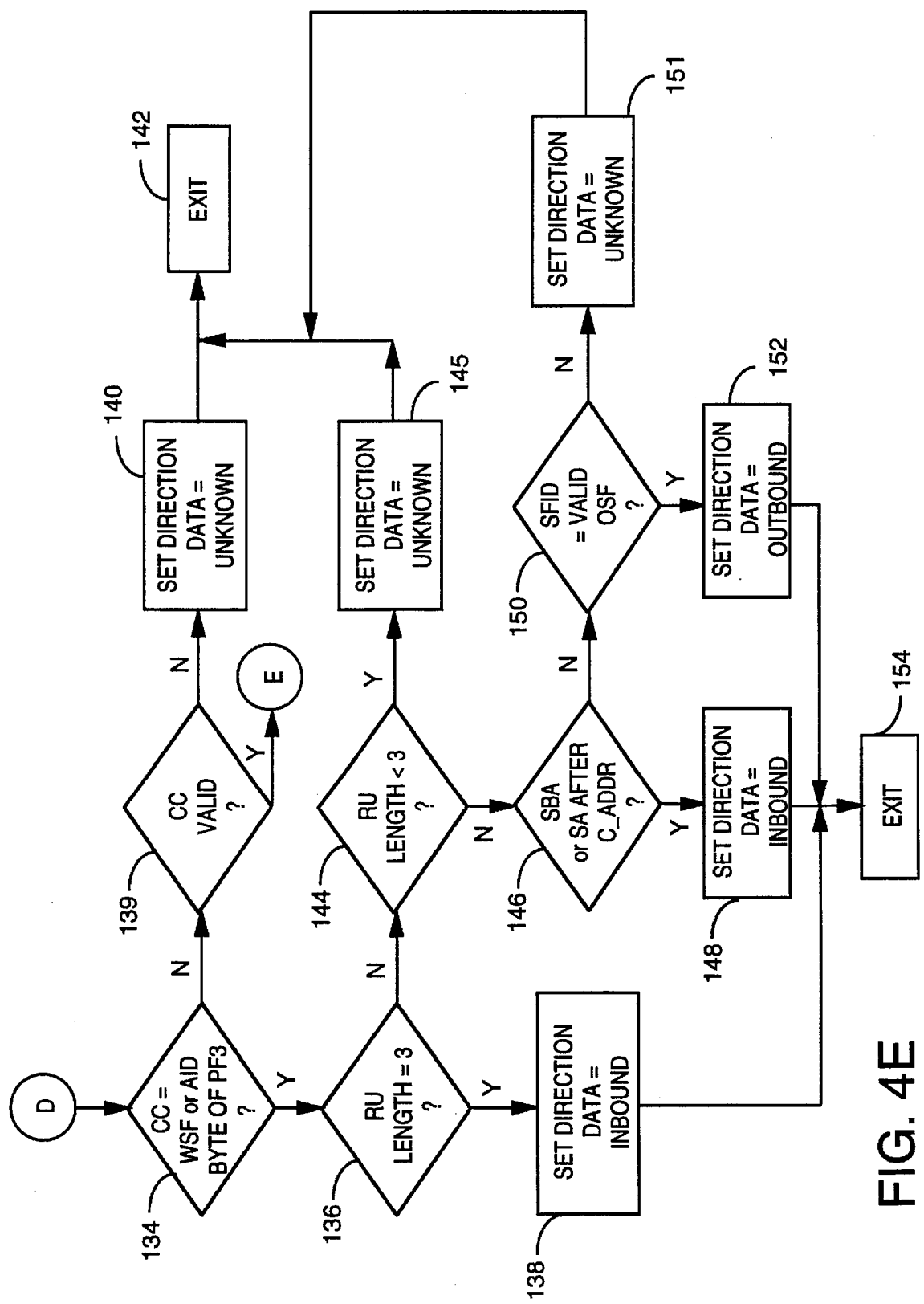

If at step 120 the command is not equal to Write, Erase/Write, or Erase/Write Alternate, then the processing flow continues at point D in FIG. 4E. If at step 124 the first byte following the WCC is not a valid order, or if at steps 122 and 128 the RU length is determined not to be greater than three and not to be equal to two, the direction is unknown and the direction data is set to UNKNOWN at steps 125 and 129, respectively, and the program is exited at step 132.

Referring to FIG. 4E, at step 134, the command code is interpreted to see if the command is Write Structured Field (Outbound) ("WSF") or the AID byte is checked for a PF3 (Inbound), that is, whether the field contains the hexadecimal value of "F3". If the command code is equal to WSF or AID byte is PF3 then the RU length is checked at step 136. If the RU length is equal to three at step 136, the message is flowing inbound and the direction data is set to INBOUND at step 138. Thereafter, the program is exited at step 154. If at step 136, the RU length is not equal to three, a check is made at step 144 to determine whether the RU length is less than three. If the RU length is not equal to three at step 136 and not less than three at step 144, the field after the cursor address ("C_ADDR") is checked to see if that field contains an Set Buffer Address ("SBA") or a Set Attribute ("SA"). If the field following the cursor address is an SBA or an SA at step 146, the message is flowing inbound and the direction data is set to INBOUND at step 148. Thereafter the program is exited at step 154. If at step 146 an SBA or SA does not follow the cursor address, the Structured Field ID ("SFID") is checked at step 150 to determine whether that field is a valid Outbound Structured Field ("OSF"). Examples of valid Outbound Structured Fields include Reset Partition, Read Partition and Erase/Reset. If at step 150 the structured field ID is a valid Outbound Structured Field, the message is flowing in the outbound direction and the direction data is set to OUTBOUND at step 152. Thereafter the program is exited at step 154.

Referring back to step 134, if the command code is not equal to Write Structured Field (outbound) or AID byte of PF3 (inbound), a check is made at step 139 to see if the command code is valid. If the command code is not valid, it is unknown as to which direction the message is flowing, and the direction data is set to UNKNOWN at step 140. Thereafter the program may be exited at step 142. If at step 139 the command code is considered valid, the processing flow continues at point E in FIG. 4F. If at steps 136 and 144 the RU length is determined to be less than three, or if at step 150 the Structured Field ID is not a valid Outbound Structured Field, the direction is unknown and the direction data is set to UNKNOWN at steps 145 and 151, respectively, and the program is exited at step 142.

Figure 4F:
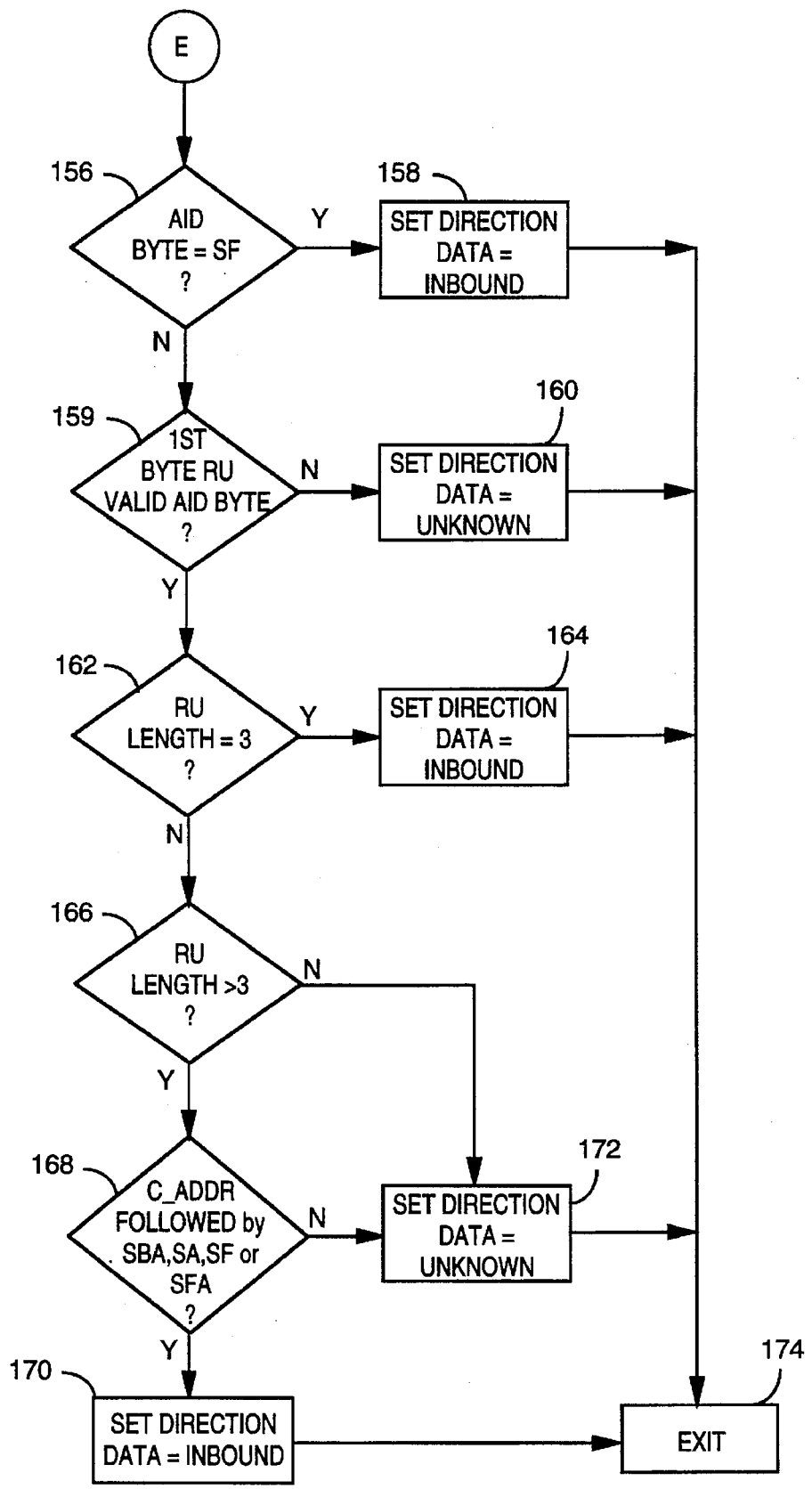

With reference to FIG. 4F, at step 156, the AID byte is analyzed to see if the AID byte is "Structured Field". If the AID byte is "Structured Field, the message is flowing in the inbound direction and the direction data is set to INBOUND at step 158. Thereafter the program is exited at step 174. If at step 156, it is found that the AID byte is not "Structured Field", then the AID byte is checked to see if it is any other valid AID at step 159. If the AID byte is not valid, the message is flowing in an unknown direction and the direction data is set to UNKNOWN at step 160 prior to exiting the program at step 174. If at step 159 the AID byte is valid, the RU length is checked at step 162. If the RU length is equal to three, then the message is flowing in the inbound direction and the direction data is set to INBOUND at step 164. The program is then exited at step 174. If at step 162 the RU length is not equal to three, the RU length is checked at step 166 to determine whether the RU length is greater than 3. If the RU length is greater than three, then the field following the cursor address ("C_ADDR") is checked to see if that field contains a Set Buffer Address ("SBA"), Set Attribute ("SA"), Start Field ("SF"), or Start Field Extended ("SFE"). If the cursor address is followed by one of Set Buffer Address, Set Attribute, Start Field or Start Field Extended as determined at step 168, then the message is flowing in the inbound direction and the direction data is set to INBOUND at step 170 prior to exiting the program at step 174. If at step 168 it is determined that the cursor address is not followed by one of Set Buffer Address, Set Attribute, Start Field, or Start Field extended, or if at step 166 it is determined that the RU length is not greater than 3, then the message is flowing in an unknown direction and the direction data is set to UNKNOWN at step 172. Thereafter, the program is exited at step 174.

It will be understood by those skilled in the art that at various points in the flow, the program may be exited and any unresolved message direction may be set to UNKNOWN. Exiting the program earlier in the flow results in decreased accuracy of the program which is countered by a faster direction data determination. The exits points of the program as identified in FIGS. 4A-4F may be determined based on application dependent requirements.

With reference to FIG. 3, the direction data as assigned above comprises the first step 52 of the Determine Role of Station function 44. At step 53, the indication as to the sender station and the receiver station on the token ring network 12 is observed from the header. At steps 54 and 56, the determination is made as to whether the station is performing the role of a primary logical unit or a secondary logical unit. If a station sends a message and if the analysis of that message indicates that the direction data is OUTBOUND, then that station is performing the role of a primary logical unit. If a station sends a message, and if the analysis of that message indicates that the direction data is INBOUND, then the sending station must be a secondary logical unit. If a station receives a message, and if the analysis of that message assigns the direction data to be INBOUND, then that station must be a primary logical unit. Finally, if a station receives a message, and the analysis of that message has assigned the direction data to be OUTBOUND, then that station must be a secondary logical unit. Table II sets forth a truth table for the primary and secondary logical unit determination identified in steps 54 and 56.

TABLE II

|  | SENDER | RECEIVER |
|---|---|---|
| INBOUND | Secondary Logical Unit | Primary Logical Unit |
| OUTBOUND | Primary Logical Unit | Secondary Logical Unit |

Figure 5:
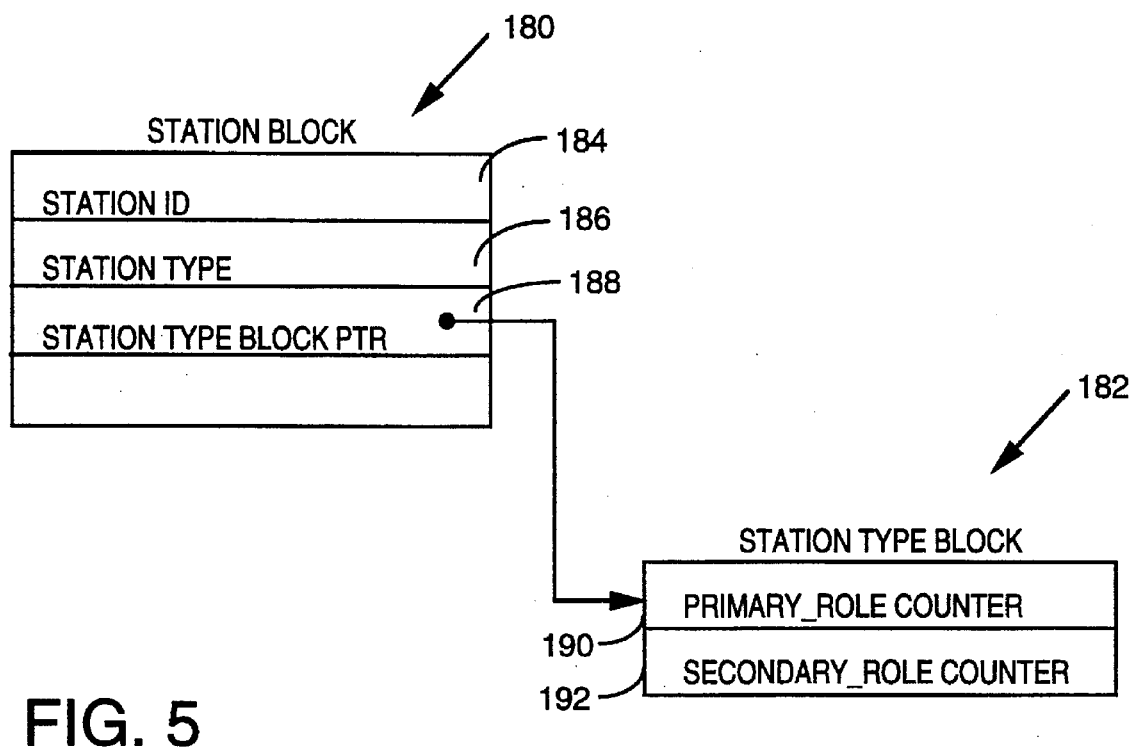
FIG. 5 illustrates a Station Control Block and Station Role Counter.

With reference to FIG. 5, there is shown a station identification block 180, containing a station identification field 184, a station type field 186, and a station type block pointer 188. There is also shown a station type block 182 which contains a primary role counter 190 and a secondary role counter 192. Each of the primary role counter 190 and secondary role counter 192 is queued from the station type block pointer 188 found in the station identification block 180.

If at step 54 the station has assumed a role of primary logical unit for that message the primary role counter 190 is incremented at step 59. If at step 56 it is determined that the station has assumed a role of secondary logical unit for that message, the secondary role counter 192 is incremented at step 60. Thus, the primary role counter 190 is incremented as a result of step 59 in FIG. 3, while the secondary role counter is incremented upon execution of step 60 in FIG. 3.

Continuing with step 62, the primary role counter 190 and the secondary role counter 192 are compared to predetermined thresholds. Such thresholds may be set depending upon the particular requirements of the application. The thresholds used herein represent a preferred embodiment, but such threshold values are not intended to be limited thereto. If at step 62, the primary role counter and the secondary role counter do not both exceed a threshold of four, a further test is made at step 64. At step 64, the primary role counter is checked to see if it is greater than six and the secondary role counter 192 is checked to see if it equals zero. If both of those conditions are met, the role is set to SNAGW at step 72. Thereafter the program is exited at step 76. If the thresholds checked at steps 64 are not met, then at step 66 the secondary role counter 192 is compared to a threshold of six while the primary role counter 190 is compared to zero. If both of those conditions are met at step 66, then the station type is workstation and the role is set to SNAWS at step 74 prior to exiting the program at step 76.

Referring again to step 62, if both the primary role counter and the secondary role counter exceed a threshold value of four, the role of the station is tentatively set to PC3270GW at step 73. A further test is made if the role of the station is tentatively set to PC3270GW at step 73 during the Gateway Statistics function 48 as described below.

Once a role has been assigned to each station on the token ring network 12, the station type block 182 is deleted. Then the message traffic on the token ring network 12 is analyzed to generate a set of operating statistics. The particular operating statistics which are generated are dependent upon the role assumed by that station. For example, the SNA response time function 46 is called and statistics are generated for those stations on the token ring network 12 which have assumed the role of workstation 14. Service time and queue depth statistics are generated by the Gateway Statistics Function 48 for stations which have assumed the role of PC3270GW 20. Finally, delay times for any messages sent from a workstation 14 to a PC3270GW station 20 or an SNAGW station 24 are generated by the Workstation to Gateway Delay function 47.

The SNA response time function 48 measures the elapsed time between when a user initiates a transaction (usually by depressing the Enter Key) and the receipt at the workstation 14 of the transaction reply. The SNA response time function 46 may, for example, comprise a portion of a commercially available program called the NETSPY™ program which is available from the assignee of the present invention.

Figure 6A:
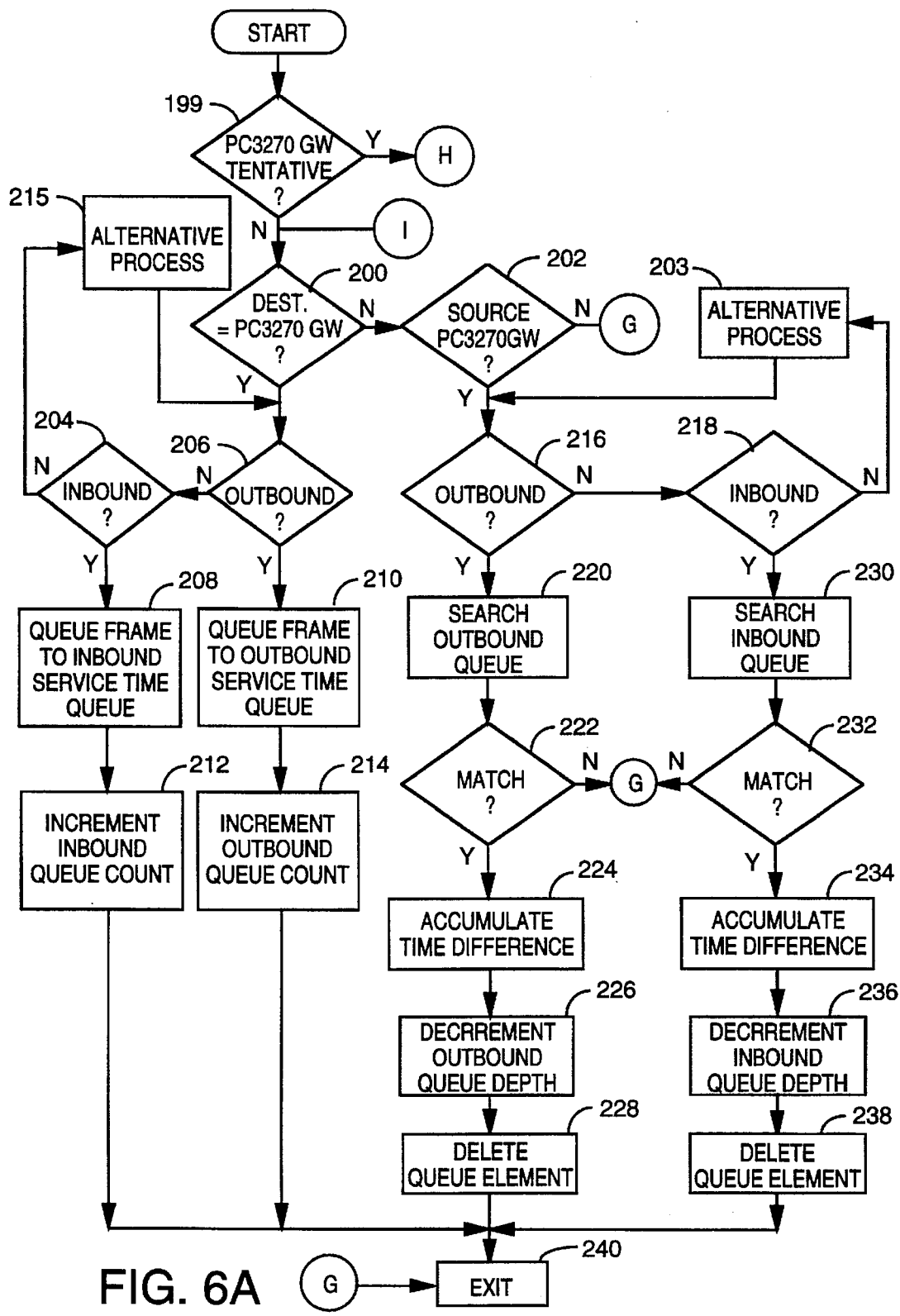
FIGS. 6A and 6B illustrate a flow chart for a system and method for computing gateway statistics.
Figure 7:
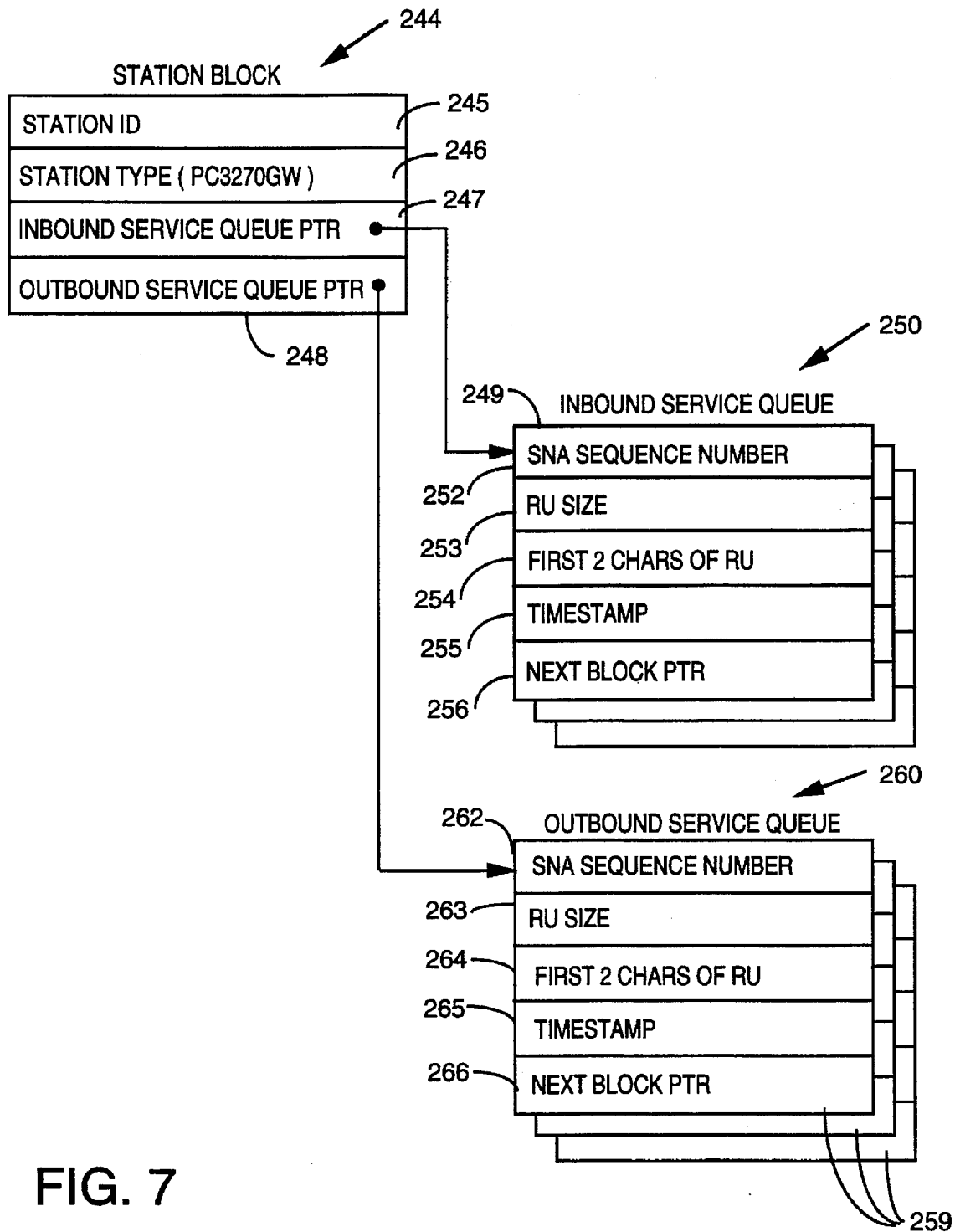
FIG. 7 illustrates a Station Control Block and Inbound/Outbound Service Queues for a PC3270 gateway.

With reference to FIG. 6A, there is shown a process flow for the Gateway Statistics function 48 for a PC3270GW station 20. The Gateway Statistics Function 48 of the network analysis program 40 will be called if the sending or receiving station is a PC3270GW station 20. With reference to FIG. 7, there is shown a station identification block 244. The station identification block 244 contains a station identification field 245, a station type field 246, an inbound service queue pointer 247, and an outbound service queue pointer 248. The station identification block 224 has fields common to the station identification control block 180 and may, depending on programming techniques and efficiency considerations, be an extension thereof. When a message, assigned an "inbound" direction data, is sent or received by a station whose role has been tentatively assigned as a PC3270GW station 20, an inbound message block 249 is created and added to an Inbound Service Queue 250 which contains sufficient information to identify the frame. In principle, this could be a copy of the entire frame, or it could be any subset of fields which makes the frame unique. As shown in FIG. 7, the inbound message block 249 preferably contains an SNA sequence number field 252, an RU size field 253, a field identifying the first two characters of the request unit 254, a time stamp 255 and a next block pointer 256.

Similarly, when a PC3270 station 20 sends or receives a message assigned on "outbound" direction data, an outbound message block 259 is created and added to an Outbound Service Queue 260 which contains similar information about the transmitted frame. The outbound message block 259 contains fields indicating the SNA Sequence Number 262, the RU size 263, the first two characters of the RU 264, a timestamp 265, and a next block pointer 266.

Figure 8:
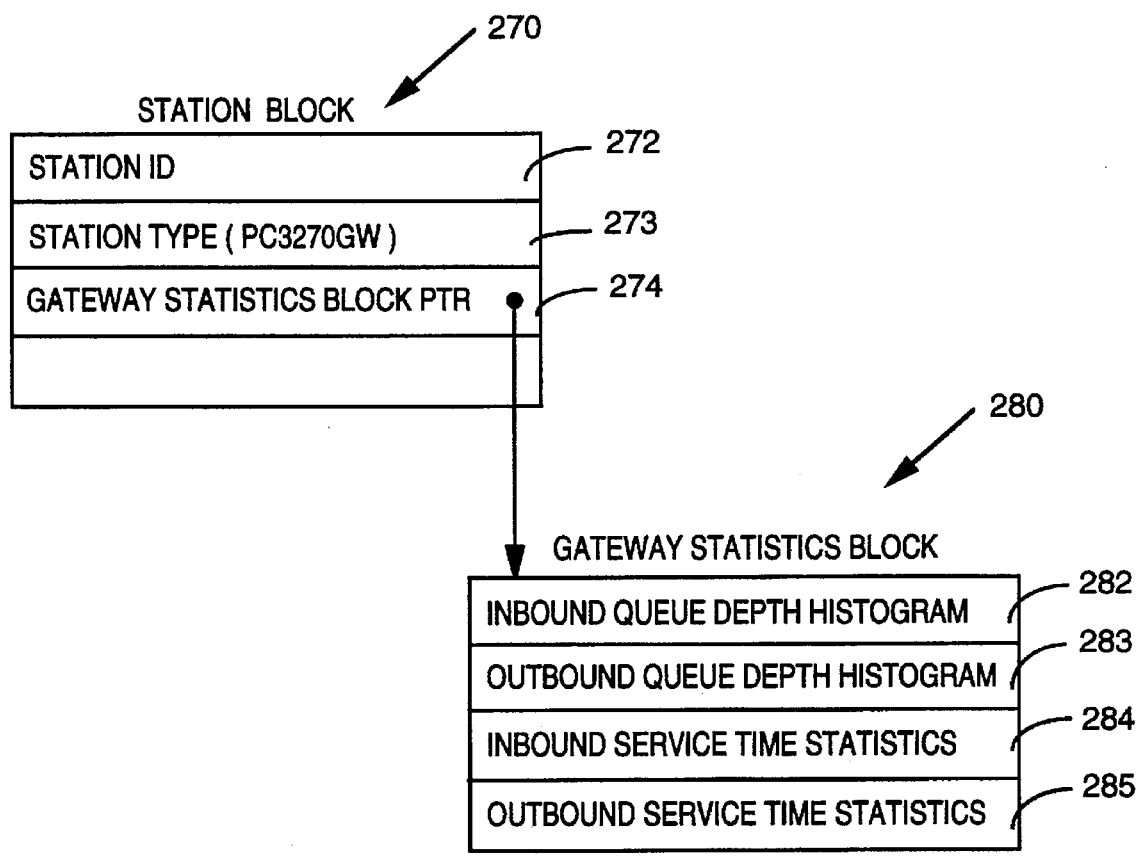
FIG. 8 illustrates a Station Control Block and Gateway Statistics block for a PC3270 gateway.

With reference to FIG. 8, a station identification block 270 similar in content to station identification block 244 with a station ID field 272, a station type field and a gateway statistics block pointer field 274 is shown. There is a gateway statistics block 280 which is queued from the gateway statistics pointer 274 which contains fields for an inbound queue depth histogram 282, an outbound queue depth histogram 283, inbound service time statistics block 284, and outbound service time statistics block 285.

When a message is sent or received by a station whose role has been determined, at least tentatively, to be a PC3270GW, a check is made at step 199 to see if the PC3270GW determination is still tentative. If so, processing continues at Point H in FIG. 6B. If not, the flow continues to step 200.

Figure 6B:
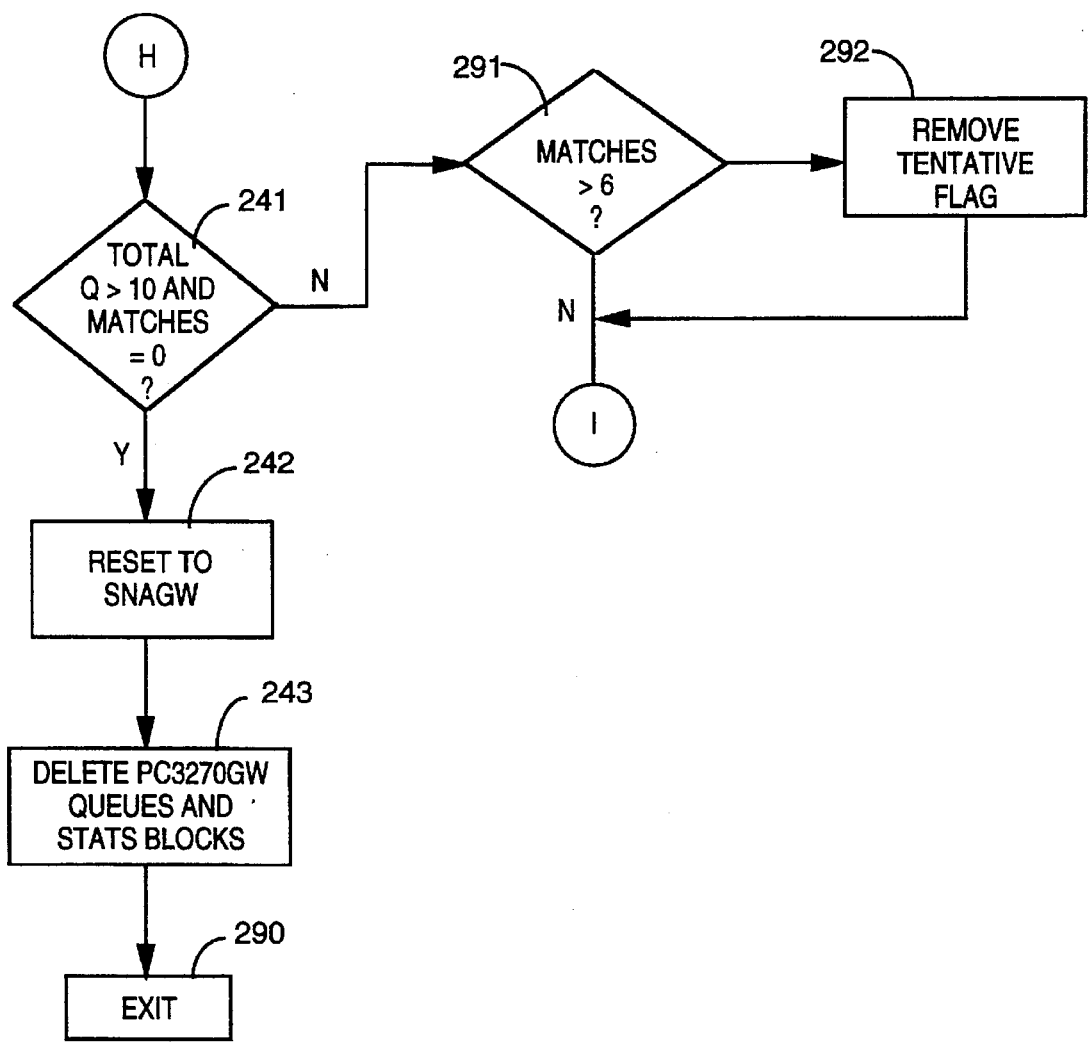

With reference to FIG. 6B, at step 241, the sum of the input queue depth and the output queue depth is compared to a predetermined threshold, e.g., ten, and a check is performed as to whether the total number of matched pairs for that station is equal to zero. If both of those conditions are met, the role is changed at step 242 to SNAGW. Thereafter, the inbound service queue 250, the outbound service queue 260, and the gateway statistics block 280 for that station are deleted at step 243 and the program is exited at step 290.

If both conditions set forth in step 241 are not met, a check is performed at step 291 to determine whether the total number of matches for that station exceed a predetermined threshold, e.g., six. If the total number of matches for that station exceed the threshold, the "tentative" designation for that PC3270GW station 20 is removed at step 292 and processing continues at point I in FIG. 6A. If, on the other hand, the total number of matches for that station does not exceed the threshold at step 291, the processing returns directly to point I.

Referring again to FIG. 6A, at step 200 the message header is read to determine whether the destination is a PC3270GW station 20. If the destination is a PC3270GW station 20, the direction of the message with respect to the session is checked. If at step 206 the direction data is OUTBOUND, the message is queued to the outbound service queue 260. At step 214 the outbound queue depth count is incremented by one. The outbound queue depth prior to incrementing at step. 214 is retained in the outbound queue depth histogram 283 writing a value in the appropriate queue bucket. A queue bucket refers to a storage area wherein, for example, one location is used if the queue depth is equal to zero or one, a second location used if the queue depth is two or three, and so on. If there were three frames already on the outbound service queue 260 when the frame is added, the location, or queue bucket (not shown), corresponding to a queue depth of three would be incremented.

If at step 206 the direction data with respect to the session is not OUTBOUND, then a check is made at step 204 to see if such direction data is set to INBOUND. If the direction data is INBOUND, the frame is queued to the inbound service queue 250 at step 208 and the inbound queue depth count is incremented at step 212. As described with respect to the outbound direction, the depth of the queue prior to incrementing at step 212 is retained in the inbound queue depth histogram 282 and the appropriate queue depth bucket (not shown) is incremented. If the direction data of the frame is UNKNOWN after performing steps 206 and 204, an alternative procedure is performed at step 215.

The alternative procedure at step 215 for use when the direction data of the frame is UNKNOWN is based on a set of assumptions wherein the role of the stations is used to decide the direction of the frame. If one of the session partners is a PC3270GW station 20 and the other session partner is an SNAGW station 24, then the assumption is made that the SNAGW 24 is the primary logical unit and the PC3270GW station 20 is the secondary logical unit. Table II may then be used to determine the direction data. If one of the session partners is a PC3270GW station 20 and the other station is a workstation 14, then the assumption is that the workstation 14 is the secondary logical unit and the PC3270GW station 20 is the primary logical unit. Again, Table II is used to determine the direction data of the frame. Note that this logic should be used at each point where the direction data is needed and where the direction data was determined to be UNKNOWN.

If at step 200 the destination station is not a PC3270GW station 20, a check is made at step 202 to see if the source of the message is a PC3270GW station 20. If neither the source or the destination stations are PC3270GW stations 20, then the program is exited at step 240. If the source station is identified to be a PC3270GW station at step 202, the direction data for that message is determined at steps 216 and 218, to be OUTBOUND or INBOUND, respectively. If the direction data is OUTBOUND, the outbound service queue 260 is checked at step 220 and step 222 is performed which entails a comparison of the outbound service queue 260, queued to a particular station identification block 244, with the inbound service queue 250, which are queued to that same station identification control 244. If no match is found at step 222, the program is exited at step 240. If at step 222 a match is found, the time difference is determined in step 224 by computing the difference between the timestamp field 265 of outbound message block 259 and the timestamp field 255 of inbound message block 249. That time difference is written to the outbound service time statistics block 285 of gateway statistics block 280. Thereafter, the outbound queue depth is decremented at step 226 and the particular queue element identifying that message is deleted from both the inbound service queue 250 and the outbound service queue 260 at step 228. The program is then exited at step 240.

A similar process is used if at step 218, the direction data is determined to be INBOUND. In the case of an inbound message wherein the source of the message was a PC3270GW Station 20, the inbound service queue 250 is updated at step 230. Thereafter, at step 232 a comparison is made between the inbound service queue 250 and the outbound service queue 260 for that particular station identification block 244 to see if there is a match. If there is no match, the program is exited at step 240. If there is a match, the time difference is determined by computing the difference between the timestamp field 255 of the inbound message block 249 and the timestamp field 265 of the outbound message block 259. That time difference is then written to the inbound service time statistics block 284 of gateway statistics block 280. Thereafter, the inbound queue depth is decremented at step 236 and the queue element for that particular message is deleted from both the inbound service queue 250 and the outbound service queue 260. The program is then exited at step 240.

If the direction data is UNKNOWN at steps 216 and 218, the alternate process as described for of step 215 is performed at step 203 and the appropriate path followed thereafter.

Depending upon the particular analysis and information desired, the inbound queue depth histogram 282 and the outbound queue depth histogram 283 may, alternatively, be a running average of the queue depth. Further, the inbound service time statistics 284 and the outbound service time statistics 285 may provide for the computation of average service time, and maintaining a history of the maximum and the minimum service time for each direction. Such statistics are useful in determining whether any particular gateway is a bottleneck in the token ring network 12 or is introducing other inefficiencies which may detract from performance.

While the present invention has been described in connection with an exemplary embodiment thereof, it will be understood that many modifications and variations will be readily apparent to those of ordinary skill in the art. This disclosure and the following claims are intended to cover all such modifications and variations.

What is claimed is:

1. A system, residing on a network analysis station connected to a local area network over which stations may send and receive messages during a session, for generating operating statistics for the local area network, said system comprising:

means for monitoring said messages on the network on one of the network level, transport level, and session level;

means, responsive to said means for monitoring, for assigning direction data to each of said messages based on an analysis of the direction which the message is traveling with respect to an ongoing session, and wherein said assigned direction data is one of inbound, outbound and unknown;

means, responsive to said means for assigning, for determining the role assumed by each of said stations with respect to said ongoing session; and means, responsive to said means for determining, for calculating statistics for one of said stations.

2. The system of claim 1 wherein one of said stations is determined to be a workstation and wherein said means for calculating comprises means for computing response times for said workstation.

3. The system of claim 2 wherein one of said stations is determined to be a gateway and wherein said means for calculating further comprises means for computing delay times for said messages sent from said workstation to said gateway.

4. The system of claim 3 further comprising means for computing an average of said delay times and means for computing a maximum and a minimum of said delay times.

5. The system of claim 1 wherein one of said stations is determined to be a PC3270 gateway and wherein said means for calculating comprises means for computing queue depth for said PC3270 gateway.

6. The system of claim 5 further comprising means for computing an average of said queue depth and means for maintaining a history of said queue depth.

7. The system of claim 1 wherein one of said stations is determined to be a PC3270 gateway and wherein said means for calculating comprises means for computing service time for said PC3270 gateway.

8. The system of claim 1 wherein said means for determining comprises means, responsive to said means for monitoring, for identifying a sender and receiver of said messages; means, responsive to said means for assigning and said means for identifying, for generating logical unit data for each of said stations for each of said messages; means, responsive to said means for generating, for summing said logical unit data for each of said stations; and means, responsive to said means for summing, for comparing said logical unit data to a threshold value.

9. A method for generating operating statistics for a network over which stations may send and receive messages during a session, said method comprising the steps of:

monitoring said messages on the network on one of the network level, transport level, and session level;

assigning direction data to each of said messages based on an analysis of the direction which the message is traveling with respect to an ongoing session, and wherein said direction data is one of inbound, outbound, and unknown;

determining the role assumed by each of said stations with respect to said ongoing session based on said assigning step; and calculating statistics for one of said stations based on said determining step.

10. The method of claim 9 wherein one of said stations is determined to be a workstation and wherein said step of calculating comprises the step of computing response times for said workstation.

11. The method of claim 10 wherein one of said stations is determined to be a gateway and said step of calculating further comprises the step of computing delay times for said messages sent from said workstation to said gateway.

12. The method of claim 11 further comprising the steps of computing an average of said delay times and computing a maximum and a minimum of said delay times.

13. The method of claim 9 wherein one of said stations is determined to be a PC3270 gateway and wherein said step of calculating comprises the step of computing queue depth for said PC3270 gateway.

14. The method of claim 13 further comprising the steps of computing an average of said queue depth and maintaining a history of said queue depth.

15. The method of claim 9 wherein one of said stations is determined to be a PC3270 gateway and wherein said step of calculating comprises the step of computing service time for said PC3270 gateway.

16. The method of claim 9 wherein said step of determining comprises the steps of identifying a sender and receiver of said messages; generating logical unit data for each of said stations for each of said messages; summing said logical unit data for each of said stations; and comparing said summed logical unit data to a threshold value.

* * * * *